April 29, 1952 H. E. LEE Re. 23,486

METHOD OF AND APPARATUS FOR PRODUCING VALVED OR SLEEVED BAGS

Original Filed April 17, 1945 7 Sheets-Sheet 1

INVENTOR
Harry E. Lee
BY
Ward, Crosby & Neal
ATTORNEYS

April 29, 1952

H. E. LEE

METHOD OF AND APPARATUS FOR PRODUCING VALVED OR SLEEVED BAGS

Re. 23,486

Original Filed April 17, 1945

7 Sheets-Sheet 2

INVENTOR

Harry E. Lee

BY

Ward, Crosby & Neal

ATTORNEYS

April 29, 1952 H. E. LEE Re. 23,486

METHOD OF AND APPARATUS FOR PRODUCING VALVED OR SLEEVED BAGS

Original Filed April 17, 1945 7 Sheets-Sheet 3

INVENTOR
Harry E. Lee

BY

Ward, Crosby & Neal
ATTORNEYS

April 29, 1952
H. E. LEE
METHOD OF AND APPARATUS FOR PRODUCING VALVED OR SLEEVED BAGS
Re. 23,486
Original Filed April 17, 1945
7 Sheets-Sheet 4
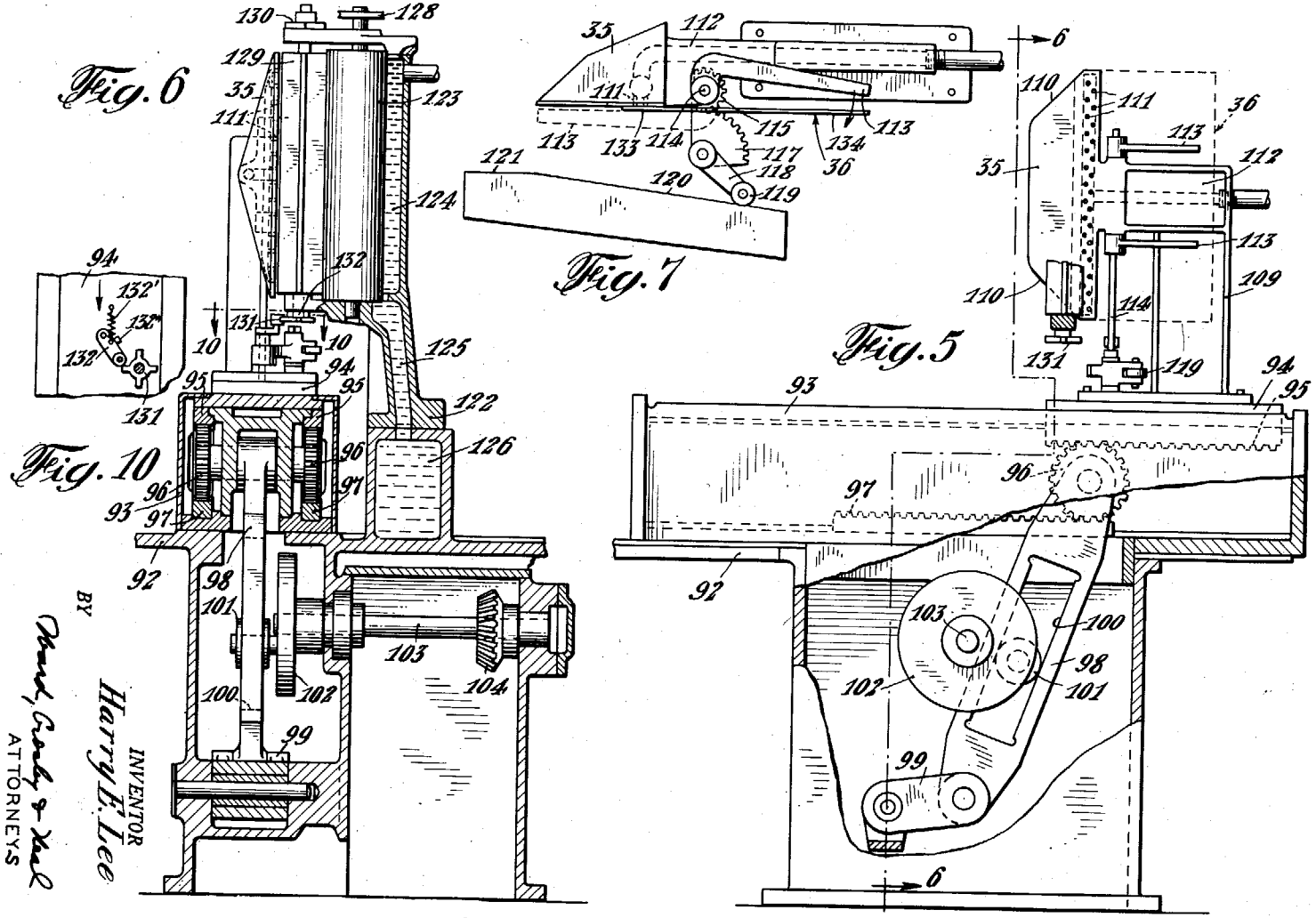
INVENTOR
Harry E. Lee
BY
Ward, Crosby & Neal
ATTORNEYS INVENTOR
Harry E. Lee
BY
Ward, Crosby & Neal
ATTORNEYS INVENTOR
Harry E. Lee
BY
Board, Crosby & Neal
ATTORNEYS April 29, 1952 H. E. LEE Re. 23,486

METHOD OF AND APPARATUS FOR PRODUCING VALVED OR SLEEVED BAGS

Original Filed April 17, 1945 7 Sheets-Sheet 7

INVENTOR
Harry E. Lee
BY
Ward, Crosby & Neal
ATTORNEYS

Reissued Apr. 29, 1952

Re. 23,486

UNITED STATES PATENT OFFICE 23,486

METHOD OF AND APPARATUS FOR PRODUCING VALVED OR SLEEVED BAGS

Harry E. Lee, Oswego, N. Y., assignor to St. Regis Paper Company, New York, N. Y., a corporation of New York Original No. 2,387,274, dated October 23, 1945, Serial No. 588,812, April 17, 1945. Application for reissue December 27, 1951, Serial No. 263,650

31 Claims. (Cl. 93—8)

Matter enclosed in heavy brackets [ ] appears in the original patent but forms no part of this reissue specification; matter printed in italics indicates the additions made by reissue.

My invention relates to a method of and apparatus for forming valves in valve bags and for securing a supplemental sleeve-forming sheet in the open corners of valve bags.

My invention, according to one aspect thereof, relates to an improved method of the character stated wherein relative movement is effected between a bag having a spread corner and a holder for a supplemental sheet, to thereby engage the spread corner of the bag with an adhesive-coated portion of the supplemental sheet, the bag corner and the supplemental sheet being thereafter suitably shaped to cause the latter to form a sleeve in the valved end of the bag.

My invention relates to a combination of apparatus involving a clamp for engaging a gusseted bag prior to operation of a pair of spreading wings, or equivalent means, the latter being movable into the gusset to spread an open corner of the bag so that a supplemental sheet carried by a movable holder may be deposited, in adhering relation, on the aforesaid spread open corner of the bag.

My invention has further reference to a novel holder arrangement for the supplemental sheet, this arrangement comprising adhesive-applying means, a folder for the supplemental sheet and mechanism for operating the holder arrangement and folder in timed relation with related parts of the apparatus.

My invention has further reference to apparatus utilizable for forming a bag having a tuck-in sleeve which is adapted to prevent material placed in the bag from sifting between the several sheets of paper forming the bag at the valve.

Various other objects, features and advantages of the invention will clearly appear from the following detailed description taken in connection with the accompanying drawings forming a part of the specification and illustrating, by way of example, one form of apparatus which may be used in carrying out the invention. The invention resides in such novel features, arrangements, and combinations of parts as may be shown and described in connection with the apparatus herein disclosed.

This application is a continuation in part of application Serial No. 464,215, filed November 2, 1942 (*now abandoned*).

In the drawings,

Fig. 5 is a side elevational view of the apparatus for applying the supplemental sheet;

Fig. 6 is a vertical sectional view taken substantially on the line 6—6 of Fig. 5;

Fig. 7 is a detailed plan view illustrating the operating means for the folding fingers;

Fig. 8 is a plan view of a portion of the apparatus including the paste-applying device;

Fig. 9 is a fragmentary sectional view taken along the line 9—9 of Fig. 1 showing a cross-section of the bag;

Fig. 10 is a detailed view showing the means for operating the paste-applying device;

Figure 11:
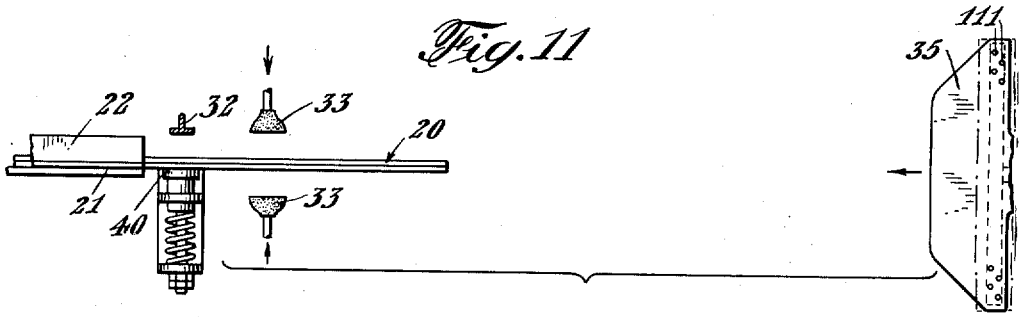
Figure 12:
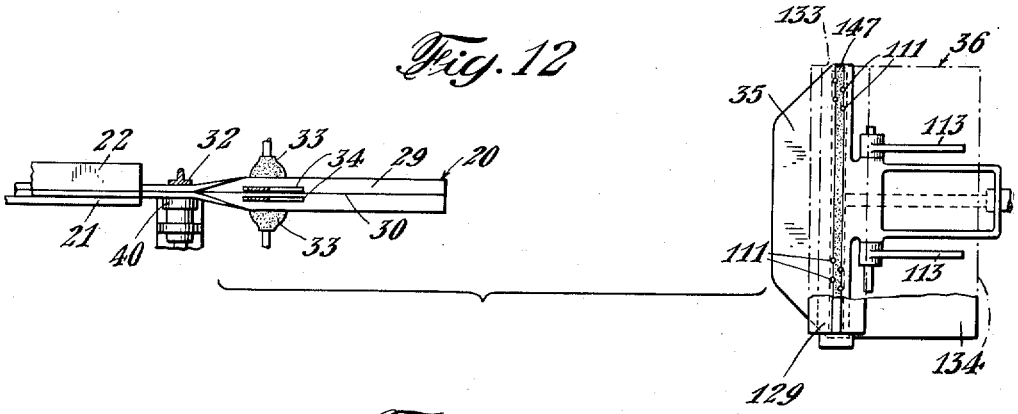
Figure 13:
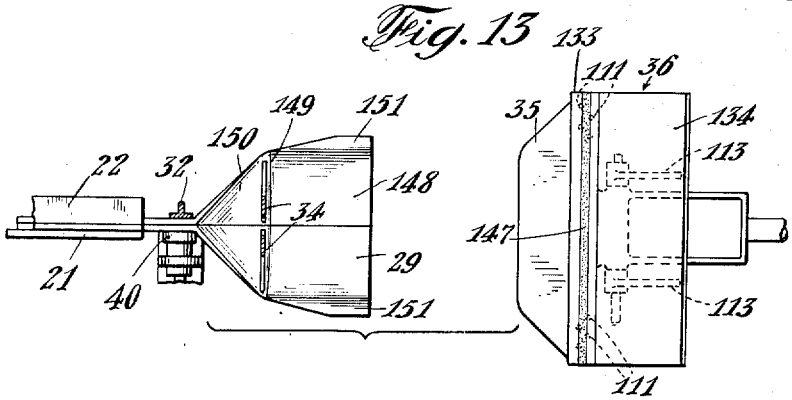
Figure 14:
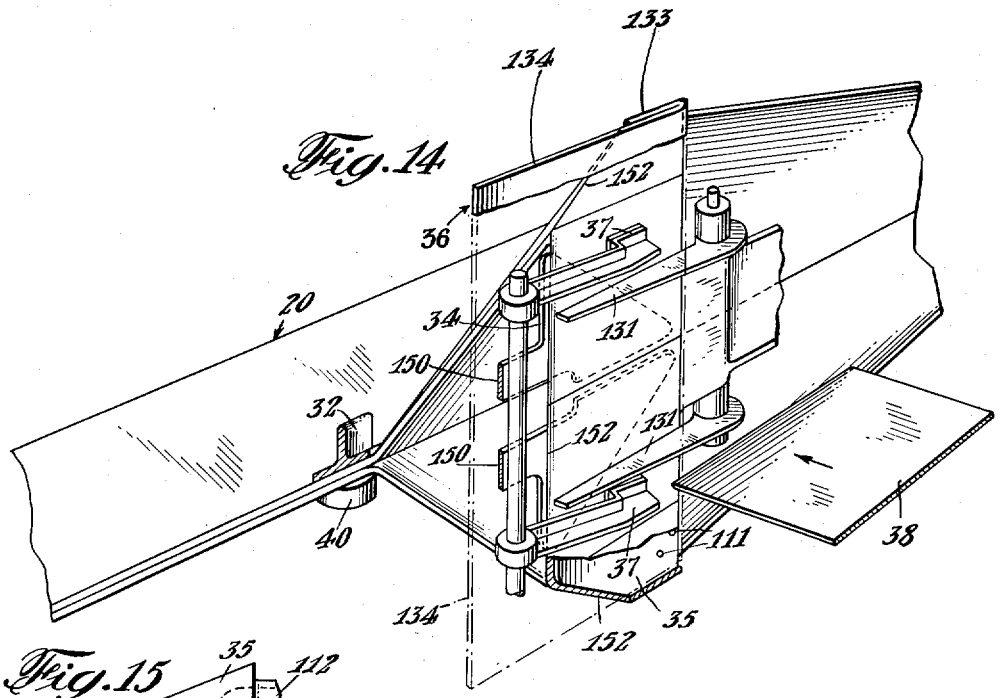
Figure 15:
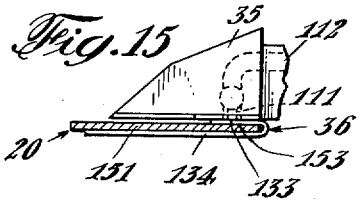
Figure 16:
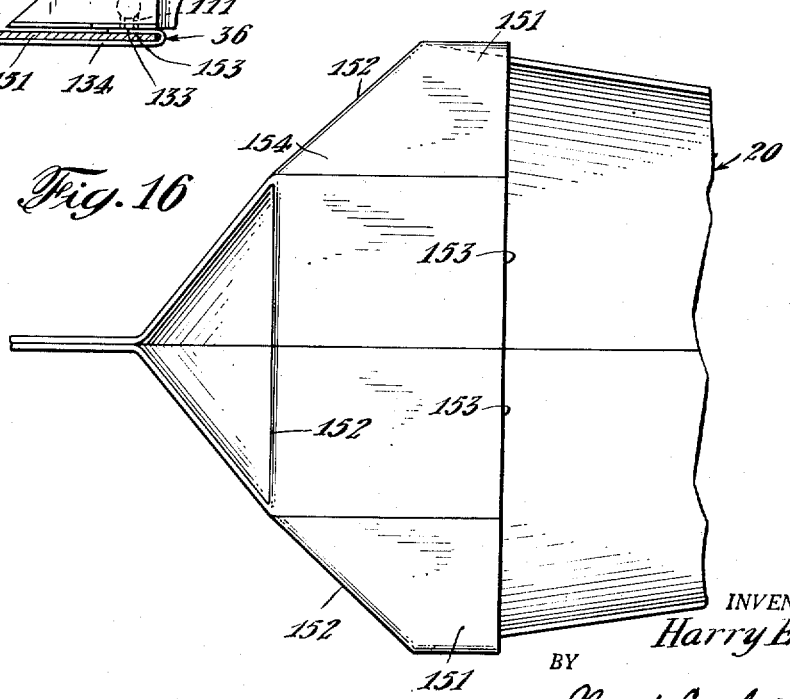
Figure 17:
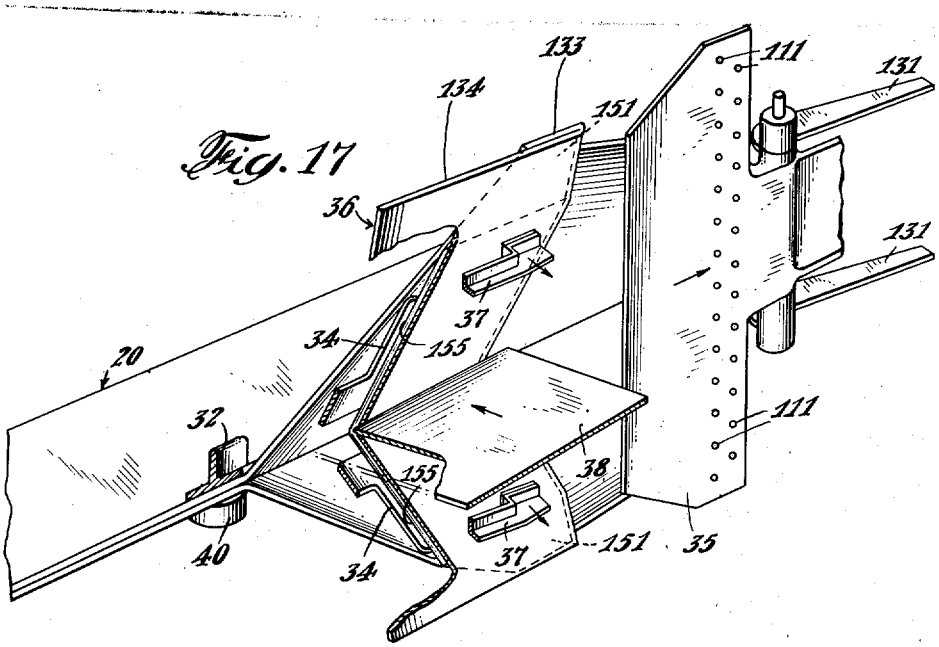
Figure 18:
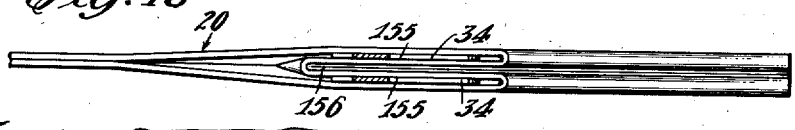
Figure 19:
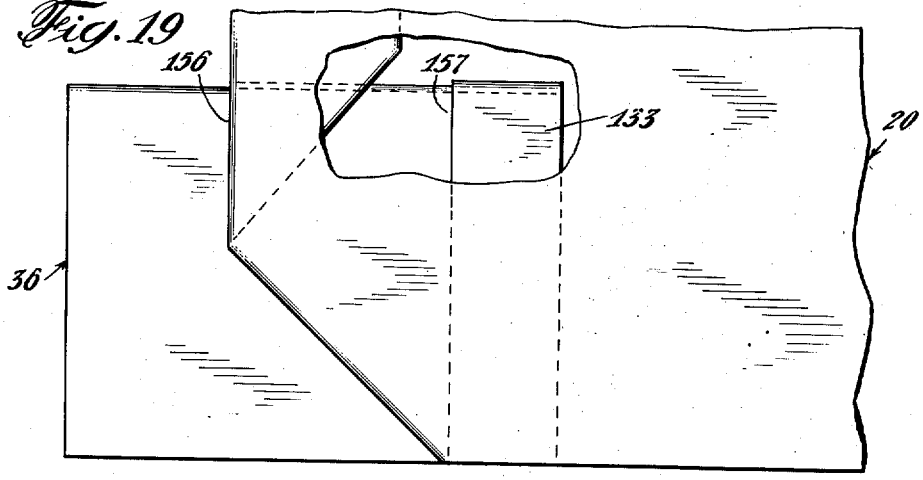

Figs. 11–13, inclusive, are diagrammatic front elevational views illustrating various stages of the valving and sleeving operation herein described;

Fig. 14 is a perspective view illustrating another step in the operation;

Fig. 15 is a diagrammatic view showing the sleeve in position against the bag;

Fig. 16 is an elevational view of the bag as it appears during the step illustrated in Fig. 14;

Figs. 17 and 18 are perspective views illustrating the final steps in my novel valving and sleeving operation; and Fig. 19 is a plan view showing the completed valve with a tuck-in sleeve inserted therein, a portion of the bag being broken away.

Figure 1:
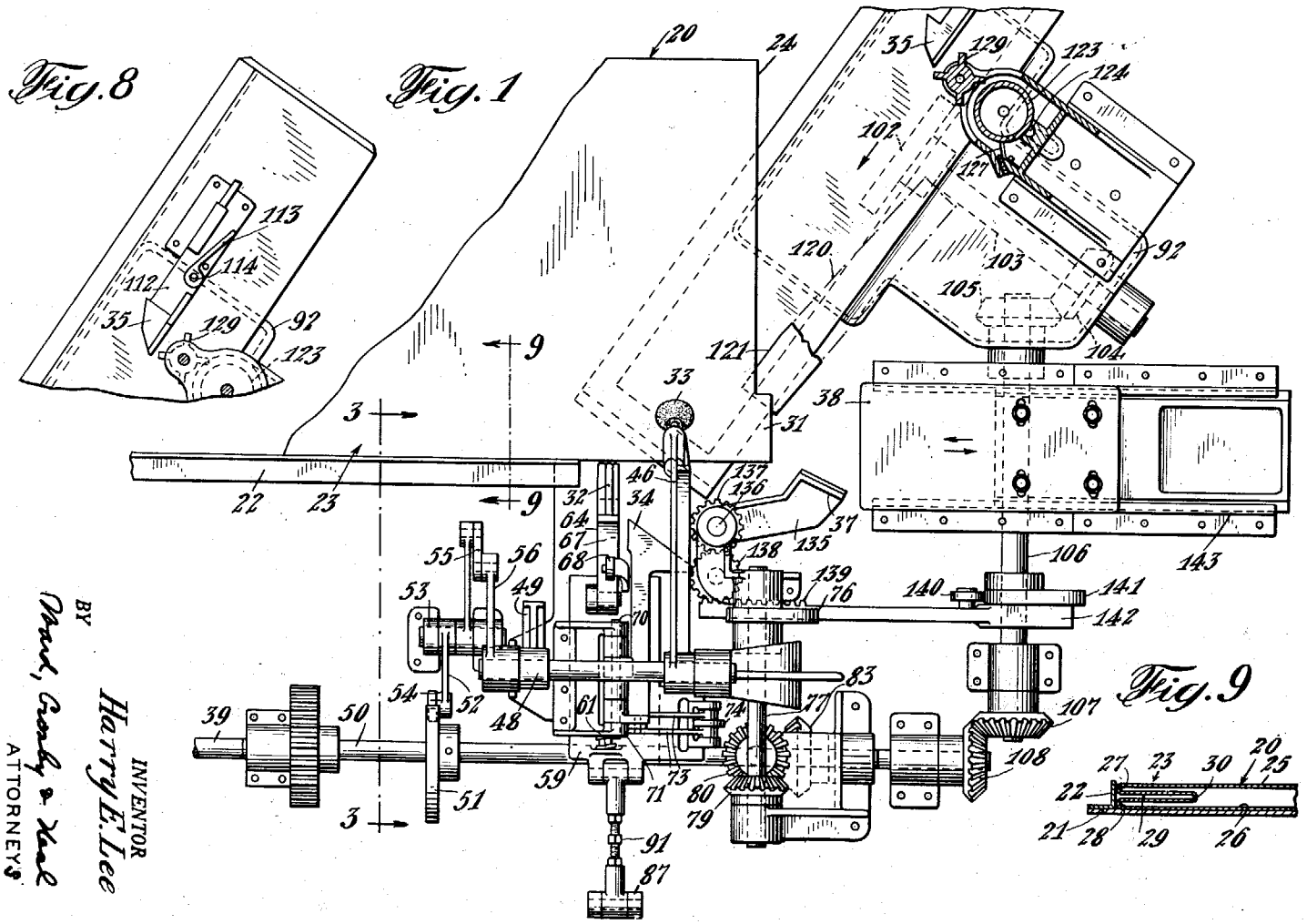
Fig. 1 is a plan view of apparatus embodying one form of the invention with some parts omitted for simplification and ease of understanding.
Figure 3:
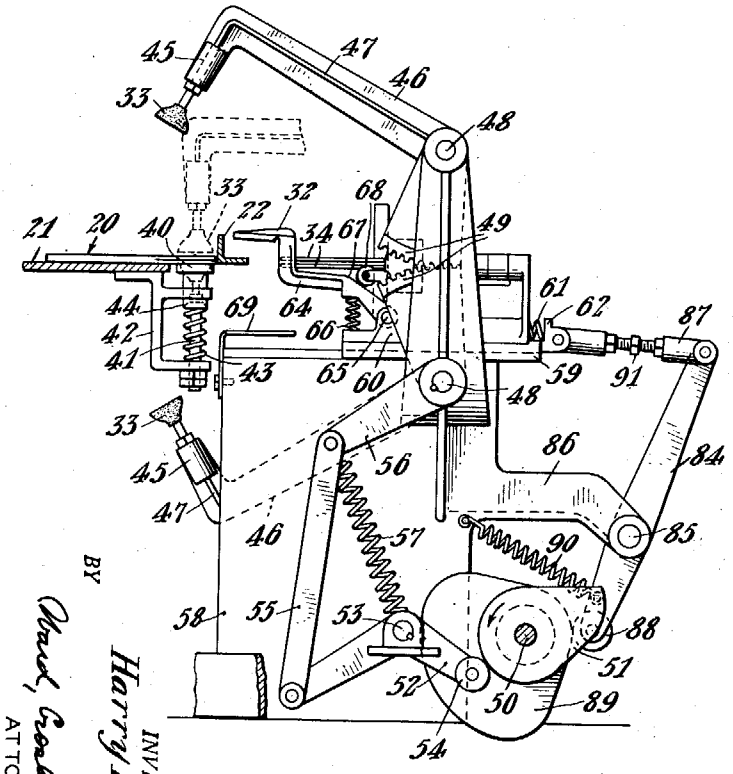
Fig. 3 is an end elevational view of the corner holding and spreading apparatus viewed substantially as from line 3—3 on Fig. 1.

Referring to the drawings in detail and particularly to Figs. 1 and 3, I have shown a paper bag blank 20 which may be properly located upon a horizontal table 21 by a flange 22 extending longitudinally of one edge 23 of the bag but stopping short of the open end portions thereof indicated at 24. The edge portions 23 of the bag 20 are preferably folded inwardly and creased as is clearly shown in Fig. 9 in which the top and bottom surfaces of the bag are shown, respectively, at 25 and 26, these surfaces folding inwardly as indicated at 27 and 28, respectively, to form a gusset as at 29 and a crease as at 30. The edge portions 23 of the bag may extend slightly beyond the open end portions 24 thus forming a projection or tab as at 31.

The parts of the mechanism operable directly upon the bag blank 20 include a clamp 32 to firmly secure the bag 20 in desired position while the valving and sleeving operation proceeds, suction cups 33, 33 to slightly spread apart or separate the upper surface 25 and the lower surface 26 of the bag and initiate spreading of the gusset 29, spreading wings 34, 34 to enter and further spread the gusset 29, a reciprocable shoe, spreading member or wedging member 35 which is adapted to carry a supplemental sheet or sleeve 36, Figs. 5 and 7, to enter the spread apart open end 24 of the bag, the shoe 35, engaging and shaping the inner surfaces of the bag in such manner as to form a substantially plane bag surface on which the sleeve 36 may be deposited, the mechanism further comprising holding members 37, 37 to hold the sleeve in position against said substantially plane bag surface during withdrawal of the shoe 35, a creasing plate 38 being provided to fold the sleeve 36 and impart the desired shape to the open end portions 24 of the bag.

The above-mentioned parts are all operated by power from a suitable main drive shaft 39 and actuated by cam action to function in proper timed relation during the folding of the bag and application of the sleeve thereto.

Figure 4:
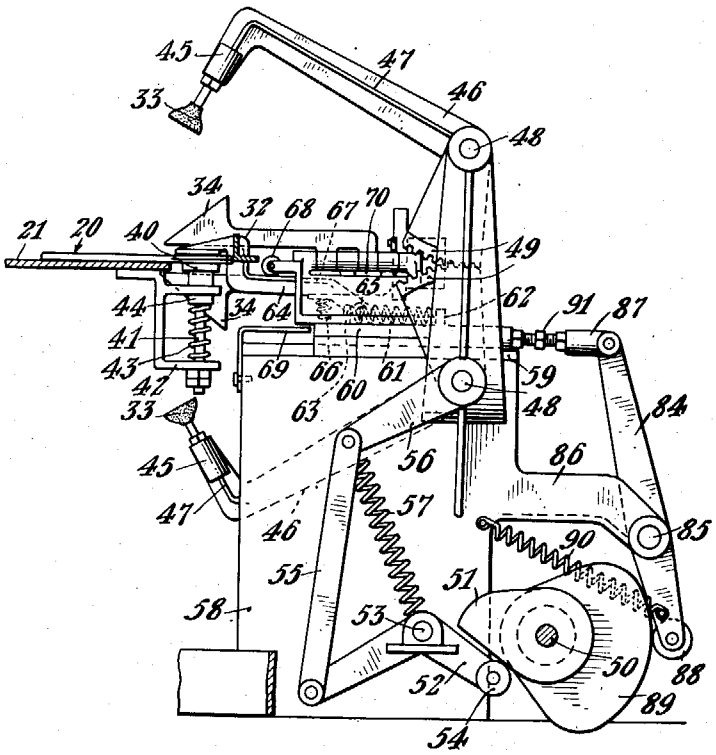
Fig. 4 is a view corresponding with Fig. 3, some of the parts being shown in different positions.

As is apparent from Figs. 3 and 4, a clamping plate 40 is located at the same level as table 21, beneath the area where the clamp 32 will be applied, the clamping plate 40 having a rod 41 extending downwardly therefrom which is journalled in a bracket 42 beneath the table 21. A spring 43 urges clamping plate 40 and rod 41 upwardly to the position shown in Fig. 3 in which position a stop 44 on rod 41 engages bracket 42. Accordingly, the edge 23 of the bag is supported upon the clamping plate 40 when the bag is properly positioned for the valving and sleeving operation.

The spreader cups 33, 33 are mounted, respectively, upon rods 45, 45 which, in turn, are mounted in arms 46, 46. Preferably, the rods 45, 45 are yieldingly mounted in the arms 46, 46 so that when the spreader cups 33, 33 are brought towards each other and against the bag, they will be yieldingly pressed against the bag. The rods 45, 45 may be hollow and may connect with passages 47, 47 in the arms 46, 46 leading to a suitable source of vacuum, if desired.

The arms 46, 46 are mounted, respectively, upon rockshafts 48, 48 which carry meshing segments 49, 49 whereby they are rocked in unison in opposite directions. A cam shaft 50 near the bottom of the apparatus carries a cam 51. A lever 52 fulcrumed at 53 is provided at one end thereof with a cam roller 54 engaging cam 51. The other end of the lever 52 is connected by a link 55 to an arm 56 on the end of the lower rockshaft 48. A spring 57 is attached to the end of arm 56 and to fulcrum 53, the spring 57 normally keeping the cam roller 54 in contact with cam 51. It will be seen that, when the lobe of cam 51 engages roller 54, the spreader cups 33, 33 move toward each other and contact the respective upper and lower surfaces of the bag 20 supported upon table 21, the spreader cups 33, 33 separating slightly as the cam 51 continues to rotate to thereby slightly spread apart the gusset 29 of the bag. As the rotation of cam 51 continues, the roller 54 engages the circular portion of cam 51 and spring 57 urges the spreader cups 33, 33 back into the full line positions of Figs. 3 and 4, the suction at the spreader cups 33, 33 being insufficient to maintain contact with the bag after the gusset has been slightly spread apart.

Figure 2:
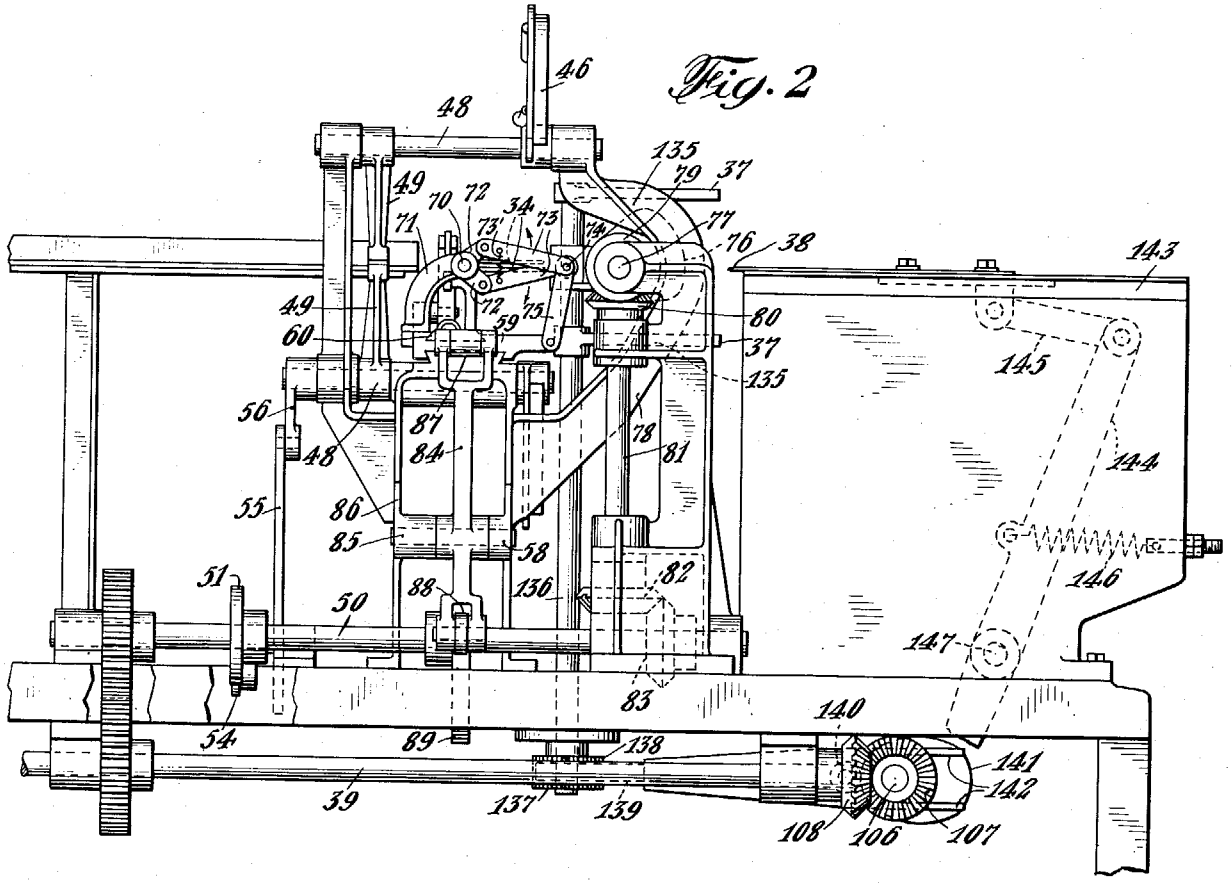
Fig. 2 is a side elevation view of the apparatus shown in Fig. 1, with the supplemental sheet applying devices and certain other parts omitted.

The parts just described are mounted upon a base 58 which carries a slide 59, Figs. 2, 3 and 4. Slide 59 is adapted to move toward and away from the table 21, Figs. 3 and 4. On slide 59 there is a sub-slide 60 which normally moves toward and away from the table 21 with slide 59. A compression spring 61 is connected to slide 59 as at 62 and to sub-slide 60 as at 63, Fig. 4, the spring 61 being fully extended when sub-slide 60 is in its normal position relative to slide 59. The clamp 32 has an arm 64 extending therefrom which is pivoted to sub-slide 60 as at 65. Normally, the clamp 32 is raised by a spring 66 to the position in which it is shown in Fig. 3. The arm 64 of clamp 32 is provided with a cam surface 67 over which rolls a roller 68 mounted upon slide 59.

As slide 59 moves from a position remote from table 21 as in Fig. 3 to a position adjacent table 21 as in Fig. 4, sub-slide 60 together with clamp 32 moves with slide 59 until the clamp 32 is in position over the clamping plate 40. At this time, sub-slide 60 engages a stop 69 with the result that the motion of sub-slide 60 toward table 21 is stopped. As slide 59 continues to move toward the table 21, the spring 61 is compressed and roller 68 engages the upper portion of cam surface 67 forcing the clamp 32 downwardly into engagement with the upper surface of the bag which, in turn, rests on the clamping plate 40.

The spreading wings 34 are mounted, respectively, upon hinges 70, Figs. 1 and 2, supported by a bracket 71 on slide 59. Arms 72, Fig. 2, extending respectively from the hinges 70 are connected by links 73 to a cam roller 74 which is supported above slide 59 by a link 75. The cam 76 is mounted upon a shaft 77 journalled in a bracket 78 on the base 58 in position so that the cam roller 74 is brought in alignment therewith when the slide 59 is in its position nearest to the table 21, Fig. 3. The outer end of shaft 77, Fig. 1, is provided with a miter gear 79 meshing with a gear 80 on the upper end of a vertical shaft 81, Fig. 2, the lower end of which carries a gear 82 in mesh with a gear 83 on shaft 50. A spring 73′ attached to the respective links 73 urges the spreading wings 34 to the closed position shown in Figs. 2 and 3. When slide 59 moves to a position adjacent the table 21, cam 76, which is driven from the main drive shaft 39 as hereinbefore described, engages roller 74 to thereby pivot the spreading wings 34 to the position shown in Fig. 4.

Slide 59 is moved toward and away from table 21, Fig. 4, by mechanism which includes a lever 84 pivoted at 85 upon a bracket 86 extending from base 58. The upper end of the lever 84 is connected by a link 87 to slide 59. A cam roller 88 on the lower end of the lever 84 is brought into contact with a cam 89 on shaft 50 by a spring 90, the shaft 50 being driven by suitable gearing from the main drive shaft 39. An adjustable screw 91 is provided for fixing the initial position of slide 59. It will be understood that, after the bag 20 is placed in position upon the table 21, slide 59 is moved towards said bag 20 and clamp 32 first extends over the gusset and keeps the gusset between this clamp 32 and clamping plate 40. The spreading cups 33, 33 are immediately closed upon the gusseted portion of the bag and then promptly separated to thereby slightly open the gusset, as previously described. Immediately after the spreading cups 33, 33 start to spread the gusset, the ends of spreading wings 34, 34 enter the gusset. At the same time, roller 68 presses clamp 32 firmly against the top of the gusseted portion of the bag, the spring under clamping plate 40 yielding slightly, if necessary. When the slide 59 reaches its position adjacent table 21, roller 74, Fig. 2, is in line with cam 76 and by the operation of that cam, the spreading wings 34, 34 are opened out to complete the spreading of the gusset.

The device for shaping the spread corner of the bag and for applying a supplemental sheet will be described next. This device is mounted upon a base 92, Figs. 1, 5 and 6, which is provided with a slideway 93 in which there is movable a slide 94. Racks 95 on the under side of the slide meshes with pinions 96, respectively, which, in turn, mesh with racks 97 on the lower side of the slideway. Pinions 96 are carried at the upper end of a lever 98, the lower end of the lever being positioned by a link 99. Lever 98 is provided with an elongated slot 100 in which works a crank roller 101 upon a crank disk 102 mounted on the end of a shaft 103, Figs. 1 and 5. The other end of shaft 103 is provided with a gear 104 which meshes with a gear 105 on a shaft 106 which, in turn, has a gear 107 meshing with a gear 108 upon the main drive shaft 39.

Mounted upon slide 94 is a bracket 109 carrying the spreader plate or shoe 35 with beveled corners 110, 110. As will become apparent later, the shoe 35 is adapted to enter the spread apart open corner of a bag and assist in forming a valve thereon. The rear of plate 35 is provided with a series of openings 111 which connect with a channel 112 on the back of the plate which, in turn, may be connected in any suitable manner to a pump for decreasing the air pressure at the openings 111. At the rear of the shoe 35 there are folding fingers 113, 113 mounted upon a rockshaft 114. On the lower end of the rockshaft 114, there is a pinion 115, Fig. 7, meshing with a segment 117 provided with an arm 118 carrying a roller 119 which encounters a cam surface 120 during the movement of the slide 94. Thus, as slide 94 moves longitudinally of slideway 93, roller 119 engages the cam surface 120, swinging fingers 113 in a clockwise direction, Fig. 7, from the full line to the dotted line position, the fingers 113 remaining in the dotted line position as the roller 119 passes along the upper flat portion 121 of cam surface 120.

Mounted upon base 92 there is also a bracket 122, Fig. 6, on which there is mounted a paste-applying device including a roller 123 which is partially surrounded by a paste channel 124, to which paste is fed through a bore 125 from a reservoir 126 in the base or bracket 122. As will be seen from Fig. 1, there is a scraper or doctor 127 provided for limiting the amount of adhesive upon the roller. The upper end of the roller is provided with a pulley 128, Fig. 6, by which it may be driven from any suitable source of power.

Adjacent the paste roller 123 there is mounted a paste transferrer 129 provided with four equally spaced paster pads. A ratchet 130 at the top of the paste transferrer 129 prevents reverse rotation of the pads while a toothed wheel 131, Figs. 5, 6 and 10, at the bottom of the paste transferrer 129 is in position to be engaged by an arm 132 on slide 94 when the slide moves past the paste-applying device. Arm 132 is normally held by a spring 132', Fig. 10, against a stop 132''. As slide 94 moves in the direction of the arrow, arm 132 engages wheel 131 turning paste transferrer 129 through an angle of 90 degrees. As slide 94 moves in reverse direction, spring 132' yields as arm 132 engages wheel 131 and paste transferrer 129 does not rotate in reverse direction.

With the parts in the position in which they are shown in Figs. 5 and 7, a supplemental sheet 36 for forming a sleeve is applied in any suitable way to the shoe 35. For example, an automatic magazine may be provided for feeding the supplemental sheets one at a time to the shoe 35.

As applied, the sheet 36 assumes the position shown in Figs. 5 and 7 and is held in place by vacuum applied through the series of holes 111 at the rear of shoe 35. As the slide moves to the left, the paste pads 129, Fig. 6, are rotated 90 degrees just as the leading edge 133 of sheet 36 and the rear edge of shoe 35 are passing the past pads 129, thus applying a strip of paste to the leading edge 133 of sheet 36. After the sheet 36 is past the paste pads, the folding fingers 113 are operated by the action of cam surface 120 on roller 119 to fold the rear end 134 of the sheet forward. The slide 94 continues to move the sheet 36 into position so that the pasted portion at 133 forms a cuff inside of the spread apart corner of the bag and the folded over portion 134 of the sheet extends on the outside of the spread apart corner of the bag.

The holders 37, Figs. 1 and 2, are mounted upon arms 135 extending from a vertical rockshaft 136. The lower end of rockshaft 136 is provided with a pinion 137 meshing with a pinion 138 which, in turn, meshes with a rack 139, carrying a roller 140 operated by a cam 141 on shaft 106. The end of rack 139 is forked as at 142 and straddles the shaft 106. Roller 140 is kept in contact with cam 141 by a suitable spring, not shown. The holders 37 are swung by cam 141 into position against the rear bent-over portions 134 of supplemental sheet 36 and press them firmly against the outer portion of the bag which is in contact with shoe 35 in its position inside the spread apart corner of the bag.

The creasing plate 38 is slidably mounted upon a base 143. A lever 144, Fig. 2, is connected to the bottom of the creasing plate 38 by a link 145 and a spring 146 normally holds the lever and slide in the position in which they are shown in Figs. 1 and 2. The lever 144 which is fulcrumed at 147, extends downwardly therefrom adjacent shaft 106 and is operated therefrom by means of a suitable cam, not shown. Creasing plate 38 moves toward the bag, Fig. 1, and engages the central portion of the sleeve 36 as shoe 35 commences to withdraw from its position inside the spread apart corner of the bag at which time the sleeve 36 is held in position against the bag by holders 37. Normal air pressure is restored to the perforations 111 as shoe 35 starts to move away from the bag whereby the sleeve 36 is disengaged from shoe 35 and remains in position on the bag. As creasing plate 38 engages sleeve 36, the holders 37 start to withdraw. Creasing plate 38 thus presses against sleeve 36 opposite the central line of the gusset, thus creasing the sleeve 36 and positioning it properly against the end of the bag.

Spreading wings 34 start to close while creasing plate 38 is in its holding position and, as the plate withdraws, the spreading wings 34 close and complete the folding of the bag corner. Thereupon, slide 59 starts out, first withdrawing the spreading wings 34 from the gusset 29 and then withdrawing the clamp 32 from over the gusset, whereupon the bag 20 may be removed in any desired manner and a new bag positioned and folded.

The various steps in the operation of my valving apparatus are successively illustrated in Figs. 11 to 18, inclusive, which will be referred to during the following brief summary of the operation.

In Fig. 11, the bag 20 is shown in its initial position upon the table 21. With the bag in this position, movement of the slide 59, Fig. 3 toward the bag causes clamp 32 to move into position over the bag and above clamping plate 40. At this time, suction cups 33, 33 move toward the respective upper and lower surfaces of the bag and movement of shoe 35 toward the bag in an angular direction is initiated as clearly appears from Fig. 1.

In the step illustrated in Fig. 12, slide 59, Figs. 3 and 4, is in its position adjacent the bag and the clamp 32 is in engagement with the upper bag surface thus holding the bag firmly between clamp 32 and clamping plate 40. It will be understood that clamp 32 holds the bag in engagement with clamping plate 40 in this manner during the rest of the operation. At this time, suction cups 33, 33 have been moved into engagement with opposite respective sides of the bag and are now slightly spread apart with the result that the gusset 29 is slightly opened. Spreading wings 34 are shown in position engaging the bag adjacent the fold or crease 30, Fig. 9, interiorly of the gusset 29. Shoe 35 is closer to the bag and the supplemental sheet 36 is held in position thereon by suction at the perforations 111. A strip of glue is shown at 147 which has been applied to the leading edge 133 of sleeve 36 during the passage of shoe 35 past the paste transferrer 129, Fig. 6. In this position, the sheet 36 is substantially flat and the folding fingers 113, 113 are in position beneath the rearward portions 134 of sleeve 36.

In Fig. 13, the spreading wings 34 and 34, in response to action of the cam 76, Fig. 2, upon roller 74 are shown in open position. Accordingly, the gusset 29 is fully opened and presents a substantially flat surface as at 148, the bag folding inwardly at 149 to form a second substantially flat surface in contact with spreading wings 34, 34. Consequently, a recessed portion exists between the spreading wings 34, 34 and the clamp 32 as indicated at 150. The respective upper and lower end portions of the bag are spread somewhat by the action of spreading wings 34, 34 as indicated at 151 to thereby distend the end of the bag in such manner as to permit the shoe 35 to enter the open corner of the bag. Rotation of the folding fingers 113, 113 has been initiated by the action of cam surface 120 on roller 119, Fig. 7, to thereby fold over the rearwardly directed portions 134 of the supplemental sheet 36. It is to be understood that the leading edge 133 of the sleeve is still held in position upon the shoe 35 by the suction at perforations 111. The suction cups 33, 33 have been withdrawn and, for simplicity, are not shown in this or succeeding views.

In Fig. 14, the shoe 35 is shown as having entered the spread apart open end of the bag 20 and is in engagement with the inner portions of the bag as at 152 the respective upper and lower portions 151 of the bag being fully extended by the entrance of the shoe 35. Fig. 16 shows the shape of the bag, during the step illustrated in Fig. 14, the supplemental sheet and portions of the mechanism operating on the bag being omitted for clarity. It will be noted that the leading edge 133 of supplemental sheet 36 passes interiorly of and engages the spread apart open end of the bag as at 153, Figs. 14 and 15. It will further be understood that the surface of the bag in contact with the shoe 35 as at 154 is a substantially plane surface and that the rear portions 134 of the sheet 36 are completely folded over by the fingers 131, 131 and pressed into engagement with said substantially plane bag surface 154. At this time, the supporting members 37, 37 swing inwardly and hold the rear portions 134 of the supplemental sheet against the bag. Normal air pressure is then restored to the perforations 111 and the shoe 35 commences to move away from the bag leaving folded over portion 134 of the supplemental sheet 36 in position against the outer bag surface 154 supported by holding members 37. At this time motion of creasing plate 38 toward the central portion of the bag is initiated.

Referring to Fig. 17, it will be noted that the shoe 35 has moved away from the bag and that creasing plate 38 is in engagement with supplemental sheet 36 to thereby crease said sleeve along a central fold line adjacent the gusset of the bag. As soon as creasing plate 38 contacts the sheet 36, the supporting members 37, 37 commence to withdraw. As creasing plate 38 moves further into the bag, the spreading wings 34, 34 start to close and engage the bag at the surfaces 155, 155, respectively, to thereby complete the closure and folding of the bag corner. The final position of the spreading wings 34 is shown in Fig. 18 in which it will be seen that a U-shaped valve 156 is provided extending laterally into the bag, the folded sleeve 36, Fig. 19 fitting into the valve 156 to provide for ready insertion of a filling tube, for example. It will be apparent that the leading edge 133 of the sleeve is folded over and held in contact with the inner surface of the valve as indicated at 157, Fig. 19, by the strip of adhesive material which was applied to the leading edge 133 during the passage of shoe 35 adjacent the pasting roll 129, Fig. 6. Referring again to Fig. 15, it will be seen that the sleeve 36 is folded around and covers the open end of the bag interiorly of the valve. Thus, if the bag were formed from several sheets of paper, for example, there would be no tendency for material to work its way between the several sheets of material into the interior of the bag. After the sleeve has been folded and applied to the bag in this manner, slide 59, Figs. 3 and 4, moves away from the bag whereupon clamp 32 is withdrawn together with the spreading wings 34, 34, at which time the bag may be removed in any suitable manner and a new bag placed upon the table 21.

It will be understood from the foregoing description that the apparatus may be easily modified to form a valve upon a bag without application of a supplemental sheet or sleeve thereto. Thus, for example, if no supplemental sheets are supplied to the shoe 35, the clamp 32, spreading wings 34, 34, suction cups 33, 33 and creasing plate 38 will operate to form a valve upon the bag. It will be apparent that the holding members 37, 37 have no function and may be omitted if the apparatus is used in this manner. Furthermore, when using the apparatus to simply form a valve upon a bag, shoe 35 may, in some cases, be omitted, sufficient spreading of the gusset 29 being obtained by action of the spreading wings 34, 34 to form the necessary folds in the valve. Furthermore, it will be understood that bags of various sizes and shapes may be valved by the novel apparatus herein described and supplemental sheets or sleeves of various shapes and dimensions may be applied thereto.

Broadly speaking, the table 21, clamp 32, and spreading wings 34, 34 constitute means for supporting a bag having a spread corner. Moreover, the portions of the shoe 35 adjacent the perforations 111 comprises holding means for a supplemental sheet or sleeve while the mechanism for moving shoe 35 together with the holding members 37 and creasing plate 38 constitute means for effecting relative movement between the sleeve and the bag to cause the sleeve to engage and be retained in engagement with the spread corner of the bag.

While the invention has been described with respect to a present preferred embodiment which has given satisfactory results, and certain modifications have been referred to, it will be understood by those skilled in the art, after understanding the invention, that various other changes and modifications may be made without departing from the spirit and scope of the invention and it is intended, therefore, in the appended claims to cover all such changes and modifications.

What is claimed as new and desired to be secured by Letters Patent is:

1. In forming a sleeve valve bag, the steps which comprise separating the walls of the open end of a bag adjacent one corner of the bag, introducing between the separated walls a spreader and moving the spreader in a diagonal direction into the bag until the corner of the bag is substantially straightened against the spreader, applying to the outside of the straightened corner a sheet adapted to form a sleeve, thereafter withdrawing the spreader while holding the sheet in position and then folding the sheet and straightened corner about a median line and collapsing the spread apart walls against the folded in sheet and corner.

2. The method of forming a sleeve in the corner of a bag, which comprises holding on a supporting member a supplemental sheet having an adhesive-coated portion, spreading apart the bag walls at an open end of the bag adjacent one corner thereof to form a substantially plane bag surface which is substantially perpendicular to the plane of the bag, effecting relative movement between the bag and said holding member to engage the plane bag surface with the adhesive-coated portion of the supplemental sheet, and folding the supplemental sheet, after substantially U-shaped configuration has been imparted thereto, and the plane bag surface inwardly between the bag walls to cause the supplemental sheet to form a sleeve in the valved end of the bag.

3. The method of forming a sleeve in the corner of a bag, which comprises holding the bag in collapsed position adjacent an open end thereof, spreading apart the bag walls at the open bag end to form a substantially plane surface between the bag walls, holding a supplemental sheet having an adhesive-coated portion on a supporting member, folding the supplemental sheet into substantially U-shaped configuration with one long leg, and with the adhesive-coated portion defining at least a part of one short leg, effecting relative movement between the plane bag surface and said supporting member to thereby position the short leg of the supplemental sheet inside the plane bag surface in adhering relation therewith and the long leg of the supplemental sheet outside the plane bag surface, and folding the supplemental sheet and the plane bag surface to cause the supplemental sheet to form a sleeve in the valved end of the bag.

4. The method of forming a sleeve in the corner of a bag, which comprises holding the bag in collasped position adjacent an open end thereof, spreading apart the bag walls at the open bag end to form a substantially plane surface between the bag walls, holding a supplemental sheet having an adhesive-coated portion on a supporting member, moving the supporting member toward the plane bag surface and, while said supporting member moves, folding the supplemental sheet into substantially U-shaped configuration with one long leg and with the adhesive-coated portion defining at least a part of one short leg, continued movement of said supporting member positioning the short leg of the supplemental sheet inside the plane bag surface in adhering relation therewith and the long leg of the supplemental sheet outside the plane bag surface, and folding the supplemental sheet and the plane bag surface to cause the supplemental sheet to form a sleeve in the valved end of the bag.

[5. In apparatus of the character described, a support for a bag, means for separating the walls of the bag at one corner thereof to form a bag surface which is substantially perpendicular to the plane of the bag, holding means for a supplemental sheet, means for effecting relative movement between said holding means and said supporting means to cause the supplemental sheet to engage and be retained in engagement with said substantially perpendicular bag surface, and means for folding said surface and the retained sheet inwardly into the plane of the bag.]

[6. In apparatus of the character described, means for clamping a bag near an open end thereof to retain the bag in a stationary position, means for spreading an open corner of the bag, holding means for a supplemental sheet, and means for moving said holding means toward the bag to deposit the supplemental sheet on a surface of the bag at the spread corner thereof, said holding means being thereafter movable from the bag.]

[7. In apparatus of the character described, means for clamping a bag near an open end thereof to retain the bag in a stationary position, means for spreading an open corner of the bag, holding means for a supplemental sheet, means for moving said holding means toward the bag to deposit the supplemental sheet on a surface of the bag at the spread corner thereof, said holding means being thereafter movable from the bag, and means for folding the corner of the bag and the supplemental sheet inwardly.]

8. In apparatus of the character described, means for clamping a bag near an open end thereof, means for spreading an open corner of the bag, holding means for a supplemental sheet, means for imparting approximately U-shape configuration to the supplemental sheet with one leg thereof longer than the other, and means for moving said holding means toward the bag to deposit the short leg of the supplemental sheet on an interior surface of the bag at the spread corner thereof, said holding means being thereafter movable from the bag.

9. In apparatus of the character described, means for clamping a bag near an open end thereof, means for spreading an open corner of the bag, holding means for a supplemental sheet, means comprising a plurality of folding fingers for imparting approximately U-shape configuration to the supplemental sheet with one leg thereof longer than the other, and means for moving said holding means toward the bag to deposit the short leg of the supplemental sheet on an interior surface of the bag at the spread corner thereof, said holding means being thereafter movable from the bag.

10. In apparatus of the character described, means for clamping a bag near an open end thereof, means for spreading an open corner of the bag, holding means for a supplemental sheet, means for imparting approximately U-shaped configuration to the supplemental sheet with one leg thereof longer than the other, and means for moving said holding means toward the bag to deposit the short leg of the supplemental sheet on an interior surface of the bag at the spread corner thereof, said holding means being thereafter movable from the bag, said third named means being operative while said holding means is moving toward the spread corner of the bag.

11. In apparatus of the character described, means for clamping a bag near an open end thereof to retain the bag in a stationary position, means for spreading an open corner of the bag, holding means for a supplemental sheet, means for applying adhesive to the supplemental sheet, means for moving said holding means toward the bag to deposit the adhesive-coated surface of the supplemental sheet in engagement with a surface of the bag at the spread corner thereof, said holding means being thereafter movable from the bag, and means for applying pressure to the engaged surfaces of the bag and the supplemental sheet.

12. In apparatus of the character described, means for clamping a bag near an open end thereof to hold said bag in a stationary position, means for spreading apart the bag walls at an open corner of the bag, holding means for a supplemental sheet, means for applying adhesive to the supplemental sheet, means for moving said holding means toward the bag to deposit the adhesive-coated surface of the supplemental sheet in engagement with a surface of the bag at the spread corner thereof, said holding means being thereafter movable from the bag, and means for applying pressure to the engaged surfaces of the bag and the supplemental sheet, said last named means comprising a member coactable with said holding means for the purpose stated.

13. In apparatus of the character described, means for holding a bag having a spread apart open corner, holding means for a supplemental sheet, and means for imparting approximately U-shaped configuration to the supplemental sheet with one leg thereof longer than the other and for depositing the long leg of the supplemental sheet upon an exterior surface of the bag at the spread corner thereof, the short leg of the supplemental sheet being in contact with an interior surface of the bag.

14. In apparatus of the character described, means for holding a bag having a spread apart open corner, holding means for a supplemental sheet, means for applying a strip of adhesive to said supplemental sheet, and means for imparting approximately U-shaped configuration to the supplemental sheet with one leg thereof longer than the other and for depositing the long leg of the supplemental sheet upon an exterior surface of the bag at the spread corner thereof, the short leg of the supplemental sheet having the strip of adhesive applied thereto and being in contact with an interior surface of the bag.

15. In apparatus for forming a valve bag, means to spread the corner of the bag diagonally between the side and the open end of the bag, means to hold a supplemental sheet, and means to move the holder to and from the bag and apply the sheet to said corner.

16. In apparatus for forming a valve bag, means to spread the corner of the bag diagonally between the side and the open end of the bag, a holder for a supplemental sheet, means to fold the sheet into a substantially U-shape with one leg longer than the other, and means to move the holder substantially in line with said corner to position the short leg of the sheet inside of the corner and the long leg of the sheet outside of the corner.

17. In apparatus for forming a valve bag, means to spread the corner of the bag diagonally between the side and the open end of the bag, a holder for a supplemental sheet, means to apply paste to one edge of the sheet upon the holder, means to move the holder to carry said pasted edge inside of the said corner with the paste next to the wall of the bag, and means for folding the other side of the sheet so that it lies outside of said corner.

18. In apparatus for forming a sleeve valve bag, means to straighten the edge of the wall of the bag at one corner in a direction transverse to the open end of the bag, means to fold a sheet into a substantially U-form with one leg longer than the other, means to insert the short leg of the sheet inside of said straightened edge of the bag wall, and means to fold the sheet and straightened edge about a line in the plane of the open end of the bag.

19. Apparatus in accordance with claim 18 and comprising means to apply adhesive to the short leg of the sheet before it is inserted in the bag.

20. In apparatus for forming a sleeve valve bag, means to straighten the edge of a corner of a bag, means to separate the walls of a bag at its open end, a spreader plate, means to hold one edge of a supplemental sheet against the rear portion of said spreader plate, means to apply adhesive to said edge of the sheet, means to move the spreader with the sheet held thereby into the end of the bag and substantially straighten the wall at one corner of the bag in a line transverse to the open end of the bag and carry the said edge of the sheet into the bag inside of said straightened edge of the bag wall, and means to fold the other edge of the sheet outside of the bag wall.

21. In apparatus for forming sleeve valve bags, means for holding, spreading apart and tucking in one corner of the bag to form a valve, in combination with a holder, means to move the holder diagonally to and from said corner, suction means on said holder for holding a sheet of paper thereagainst, and means for applying adhesive to the paper while the holder is being moved towards the bag, the parts being timed and related so that the holder applies the paper to the open corner of the bag before it is folded in.

22. In apparatus for forming a sleeve valve in a gusseted bag, a clamp for holding the gusset collapsed near one corner, spreading wings adapted to enter the gusset of the bag and spread the gusset adjacent the clamp, a holder, means to move the holder in a rectilinear line diagonally towards and from the clamp, a spreader plate on the holder adapted to enter the corner of the bag and straighten the edge of the wall of the bag at the corner, suction means for holding a sheet of paper against the rear edge of the spreader plate, means for applying adhesive to the sheet where it is held by the spreader plate, and means operative after the application of the adhesive to swing the rear edge of the sheet of paper forward in the direction of the movement of the holder, means for pressing the folded forward portion of the sheet against the bag wall when the spreader plate is within the bag whereby the adhesive is pressed between the sheet and bag wall by the spreader plate and said pressing means, the parts being timed to retain said pressing means in position while the spreader plate is at least partially withdrawn, a creaser plate, and means to move the creaser plate to and from the corner in the plane of the collapsed bag, whereby the spread apart corner and the sheet applied thereto are creased along a central fold line.

23. In apparatus for folding in the corner of a bag to form a valve, means for supporting a collapsed bag in position for valving, means to spread apart the walls at the open end of the bag and substantially straighten the edge of the wall at the corner in a line transverse to the plane of the collapsed bag, a plate rectilinearly reciprocable in the plane of the collapsed bag and in a direction parallel with the edge of the bag, the edge of said plate being perpendicular to its line of travel, means to move said plate against the spread apart corner and to collapse the spread apart corner against the opposite sides of the plate as it is being withdrawn.

24. In apparatus for valving a gusseted bag, means for holding the bag in position to be valved, a slide, spreaders carried by the slide, means to move the slide to insert the spreaders in the gusset, a sub-slide carried on the first said slide, a clamping member pivoted to the sub-slide and adapted to extend over the gusset when the slide is moved inward, and means for tightening the clamping member by relative movement of the sub-slide and the first said slide.

[25. In apparatus of the character described, means for clamping a bag near an open end thereof to hold the bag in a stationary position, means for spreading an open corner of the bag, holding means for a supplemental sheet, and means for moving said holding means to deposit the supplemental sheet on a surface of the bag at the spread corner thereof.]

26. In apparatus of the character described, means for clamping a bag near an open end thereof, means for spreading an open corner of the bag, a shoe, and means for moving said shoe into the bag to engage the inner surfaces thereof and form a substantially plane bag surface, said shoe being thereafter movable from the bag, and means to deposit at least a portion of a supplemental sheet upon said substantially plane bag surface.

27. In apparatus of the character described, a support for a bag, means for separating the walls of the bag to form a substantially plane bag surface at one corner of the bag which is substantially perpendicular to the plane of the bag, supporting means for an individual supplemental sheet, means for detachably securing such an individual supplemental sheet to said supporting means, means for effecting relative movement between said support and said supporting means to cause said individual supplemental sheet to engage and be retained in engagement with said plane bag surface, and means for folding said surface and the retained sheet inwardly into the plane of the bag.

28. In apparatus of the character described, means for supporting a bag having a gusset at one side thereof, means for spreading apart the gusset of the bag adjacent one bag corner to form a substantially plane bag surface which is substantially perpendicular to the plane of the bag, holding means for a supplemental sheet, means for effecting relative movement between said holding means and said supporting means to cause the supplemental sheet to engage and be retained in engagement with said substantially plane bag surface, and means for folding said surface and the retained sheet inwardly into the plane of the bag.

29. In apparatus of the character described, a support for a bag, spreading means for separating the walls of the bag to form a spread corner, said spreading means comprising spreading wings which initiate the separation of the bag walls and a shoe which enters the bag and forms a substantially plane bag surface at the spread corner, supporting means for a supplemental sheet, and means for effecting relative movement between said bag support and said supporting means to cause the supplemental sheet to be engaged and retained in engagement with the spread corner of the bag.

[30. In apparatus of the character described, means for supporting a bag having a gusset at one side thereof, means for clamping the bag near an open end thereof to hold the bag in a stationary position, means for spreading apart the gusset of the bag adjacent one bag corner to form a plane bag surface, holding means for a supplemental sheet, and means for moving said holding means to deposit the supplemental sheet on said plane bag surface.]

31. In apparatus of the character described, a support for a bag, means for separating the walls of the bag to form a substantially plane bag surface at one corner of the bag which is substantially perpendicular to the plane of the bag, supporting means for an individual supplemental sheet, means for detachably securing such an individual supplemental sheet to said supporting means, means for effecting relative movement between said support and said supporting means to cause said individual supplemental sheet to engage and be retained in engagement with said plane bag surface, and means for folding the open corner of the bag and said supplemental sheet inwardly to thereby form a sleeved valved bag.

[32. In apparatus of the character described, means for clamping a bag near an open end thereof to hold the bag in a stationary position, means for spreading an open corner of the bag, holding means for a supplemental sheet having an adhesive-coated portion, means for moving said holding means to deposit the supplemental sheet on a surface of the bag at the spread corner thereof, means for applying pressure to the engaged surfaces of the bag and the supplemental sheet, and means for folding the open corner of the bag and said supplemental sheet inwardly to thereby form a sleeved, valved bag.]

*33. In apparatus of the character described, a support for a gusseted bag blank: means for separating the walls of the bag blank at one corner thereof, such means comprising a spreader device having a pair of wings spreadable within the gusset at such corner of the bag blank to form a bag surface which is substantially perpendicular to the plane of the bag and which forms an accessible valve flap; holding means for a supplemental sheet, said holding means having a sheet retaining member; means for effecting relative movement between said holding means and said bag blank supporting means to cause the supplemental sheet to engage and be retained in engagement with said substantially perpendicular bag surface, said means for effecting relative movement comprising a power driven device operatively connected to said holding means; means for folding said surface and the retained sheet inwardly about the median line of the valve flap into the plane of the bag, such folding means comprising a creasing member; and interconnected drive means for actuating in timed relationship said spreader device and said power driven device to effect said relative movement between said holding means and said bag blank supporting means to apply the supplemental sheet behind said flap, and thereafter to withdraw said holding means from behind said flap and to actuate said creasing member for so folding said surface and sheet.*

*34. In apparatus of the character described, means including a clamp for clamping a gusseted bag blank near an open end thereof to retain the bag blank in a stationary position; means for spreading an open corner of the bag blank, said spreading means including a spreader device insertable into the gusset of the bag blank and having a pair of pivotally mounted elements which are separable to open such corner; holding means for a supplemental sheet, said holding means including a sheet retaining element; means including a power driven device operatively connected to said holding means for moving the latter toward the bag blank to deposit the supplemental sheet on a surface of the bag blank with a portion of such sheet behind the spread corner thereof, said holding means being thereafter movable from the bag blank; foldover mechanism for engaging a supplemental sheet and folding same into substantially U-shaped configuration with one leg located exteriorly of such open spread corner and the other leg comprising said portion positioned as aforementioned behind the spread corner of the bag blank; means comprising a creasing member for folding the spread open corner of the bag blank and the supplemental sheet about a median line thereof; and interconnected drive means for actuating in timed relation said spreader device and said power driven device to effect said relative movement between said holding means and said bag blank to apply the supplemental sheet to the spread corner of the bag blank, and to actuate said foldover mechanism for folding the supplemental sheet over the spread corner of the bag blank, and thereafter to actuate said creasing member for so folding said corner and supplemental sheet to close said spreader device thereby to collapse said open corner with the supplemental sheet therein.*

*35. In apparatus of the character described, means for clamping a gusseted bag blank near an open end thereof to hold the bag in a stationary position; means for spreading an open corner of the bag blank comprising a spreader device having a pair of wings spreadable within the gusset at such corner of the bag blank to form an accessible valve flap; holding means for a supplemental sheet comprising a sheet retaining member; means for moving said holding means to deposit the supplemental sheet on a surface of the bag at the spread corner thereof with a portion of such sheet positioned behind said valve flap; means comprising a foldover member for folding said supplemental sheet into substantially U-shaped configuration with one leg located exteriorly of such valve flap and the other leg comprising such portion positioned as aforementioned behind such flap; means comprising a creaser member for folding said valve flap and supplemental sheet inwardly about a median line thereof; and interconnected drive means for actuating in timed relationship said spreader device, said moving means so to deposit said sheet by said holding means, the latter thereafter being withdrawn, and said creaser member for so folding said flap and sheet.*

*36. In apparatus of the character described, means for supporting a bag having a gusset at one side thereof; means including a clamp for clamping the bag near an open end thereof to hold the bag in a stationary position; means for spreading apart the gusset of the bag adjacent one bag corner to form a plane bag surface, said spreading means including spreader wings insertable in the gusset, such wings being separable to spread apart the gusset; holding means for a supplemental sheet, said holding means including a supplemental sheet retaining member; automatic adhesive applicator means for depositing adhesive upon each of the supplemental sheets, means for moving said holding means toward the bag to deposit the supplemental sheet on said plane bag surface, said moving means including a power device operatively connected to said holding means; means comprising a creasing member for folding the spread open corner of the bag and the supplemental sheet about a median line thereof for collapsing such open corner; and interconnected drive means for actuating in timed relationship said spreading means, said power device to effect relative movement between said holding means and the bag, and said creasing member for so folding said corner and supplemental sheet.*

*37. In apparatus of the character described, means including a clamp for clamping a gusseted bag near an open end thereof to hold the bag in a stationary position; means for spreading an open corner of the bag, such spreading means comprising a spreader device having spreader wings which are insertable near said clamp in a gusset of the bag when such wings are in a substantially closed condition, said wings being openable to spread such gusset and the corner of the bag to form an accessible valve flap; holding means for a supplemental sheet having an adhesive-coated portion, such holding means comprising a supplemental sheet retaining device; means for moving said holding means to deposit the supplemental sheet on a surface of the bag at the spread corner thereof with a portion thereof behind said valve flap, such moving means comprising a power driven device and mechanism for operatively connecting same to said holding means; means for applying pressure to the engaged surfaces of the bag and the supplemental sheet, means including a creaser plate for folding the open corner of the bag and said supplemental sheet about a median line thereof inwardly to*

*thereby form a sleeved, valved bag; and interconnected drive means for actuating in timed relationship said spreader device, said power driven device for moving said holding means so to deposit the supplemental sheet upon said valve flap, and said creaser plate for so folding said bag corner and supplemental sheet.*

HARRY E. LEE.

REFERENCES CITED

The following references are of record in the file of this patent or the original patent:

UNITED STATES PATENTS

| Number | Name | Date |
|---|---|---|
| 948,439 | Beam | Feb. 9, 1910 |
| 1,780,720 | Redington | Nov. 4, 1930 |
| 1,852,026 | Redington | Apr. 5, 1932 |
| 1,880,839 | Currier | Oct. 4, 1932 |
| 1,916,293 | Andreas | July 4, 1933 |
| 2,205,633 | Sharkey | June 25, 1940 |
| 2,231,051 | Bischoff | Feb. 11, 1941 |
| 2,300,553 | Lee et al. | Nov. 3, 1942 |